United States Patent
Kawamoto et al.

(10) Patent No.: US 7,445,107 B2
(45) Date of Patent: Nov. 4, 2008

(54) HYDRAULIC CLUTCH CONTROL SYSTEM AND METHOD

(75) Inventors: Yoshinobu Kawamoto, Kanagawa (JP); Masaaki Uchida, Kanagawa (JP); Shusaku Katakura, Kanagawa (JP); Tomoaki Honma, Kanagawa (JP)

(73) Assignee: JATCO Ltd, Shizuoka (JP)

( * ) Notice: Subject to any disclaimer, the term of this patent is extended or adjusted under 35 U.S.C. 154(b) by 342 days.

(21) Appl. No.: 11/445,208

(22) Filed: Jun. 2, 2006

(65) Prior Publication Data

US 2006/0272919 A1    Dec. 7, 2006

(30) Foreign Application Priority Data

Jun. 3, 2005    (JP)   ............... 2005-164398

(51) Int. Cl.
*F16D 48/08*    (2006.01)
*F16D 25/0638*    (2006.01)

(52) U.S. Cl. ............... 192/85 AA; 192/85 R; 192/109 F; 192/30 W; 701/68

(58) Field of Classification Search ............ None
See application file for complete search history.

(56) References Cited

U.S. PATENT DOCUMENTS 5,029,678 A * 7/1991 Koshizawa ............ 192/30 W 6,658,341 B2 * 12/2003 Inoue et al. ............ 701/67

FOREIGN PATENT DOCUMENTS

| JP | 2595812 B2 | 7/1992 |
|---|---|---|
| JP | 07239020 A * | 9/1995 |

\* cited by examiner

*Primary Examiner*—Richard M. Lorence
(74) *Attorney, Agent, or Firm*—Foley & Lardner LLP

(57) ABSTRACT

A hydraulic clutch control system includes a clutch, a hydraulic circuit that supplies a hydraulic pressure to a piston of the clutch so as to cause a stroke of the piston for engagement of the clutch, a primary hydraulic pressure signal generation unit that generates a primary hydraulic pressure signal to regulate a magnitude of the hydraulic pressure, a secondary hydraulic pressure signal generation unit that generates a secondary hydraulic pressure signal to induce fluctuations in the hydraulic pressure, a hydraulic pressure control unit that operates the hydraulic circuit to control the hydraulic pressure according to the primary and secondary hydraulic pressure signals, a detection unit that detects the amount of fluctuations in the hydraulic pressure and a piston stroke judgment unit that judges the piston stroke based on the hydraulic pressure fluctuation amount.

18 Claims, 8 Drawing Sheets

PULSE COMMAND HYDRAULIC PRESSURE

ACTUAL HYDRAULIC PRESSURE

SECONDARY HYDRAULIC PRESSURE SIGNAL

HYDRAULIC CLUTCH CONTROL SYSTEM AND METHOD

BACKGROUND OF THE INVENTION

The present invention relates to a hydraulic clutch control system and method.

An automotive vehicle has a clutch mechanism arranged on a power transmission line to selectively connect and disconnect the transmission of power from a vehicle engine (such as internal combustion engine) or electric motor to wheels under vehicle drive/shift control. There are some types of clutch mechanisms including a friction clutch in which rotary elements are engaged to allow power transmission due to friction between the rotary elements. One example of friction clutch is known as a multiple disc clutch. The multiple disc clutch has first and second rotary elements and a clutch piston actuated by hydraulic pressure to press the first rotary elements against the second rotary elements and thereby engage these rotary elements such that the degree of engagement of the rotary elements can be controlled according to the hydraulic pressure on the clutch piston. The multiple disc clutch also has a return spring to bias the clutch piston apart from the rotary elements and leave some clearance between the clutch piston and the rotary element for complete disengagement of the rotary elements when the hydraulic clutch pressure becomes decreased to a certain level. In the case that the multiple disc clutch starts from such a complete disengagement state, the rotary elements cannot be engaged until the clutch piston comes into contact with the rotary element i.e. during a so-called idle stroke of the clutch piston. This results in slow clutch response.

Thus, it has become conventional to detect the amount of clearance between the clutch piston and the rotary element, calculate the hydraulic pressure to be exerted on the clutch piston to eliminate the detected clearance and complete the clutch piston idle stroke, and then, reflect the calculated value of the hydraulic clutch pressure in actual clutch control operation.

Japanese Patent No. 2595812 discloses a control device employing such a clutch control technique. The control device of Japanese Patent No. 2595812 is characteristically configured to limit the hydraulic clutch pressure to a first level (higher than the return spring tension and lower than the initial design clutch engagement force) during a predetermined time period, gradually increase the hydraulic clutch pressure to a second level at a given rate and, during the increase of hydraulic clutch pressure, judge the timing of completion of the clutch piston idle stroke (the timing of contact of the rotary elements) by sequential second-order differentiation of the actual hydraulic clutch pressure value.

SUMMARY OF THE INVENTION

In the above-disclosed control device, however, the timing of completion of the clutch piston idle stroke is determined as a point at which the second-order differentiation result of the hydraulic clutch pressure becomes maximized before the first-order differentiation result of the hydraulic clutch pressure reaches zero. Namely, the timing of completion of the clutch piston idle stroke cannot be judged until the clutch shifts from a partial engagement state (slip state) into a complete engagement state where clutch disc engagement produces no effect on the other part of the vehicle drive train. The control device is thus poor in versatility. Further, the second-order differentiation result of the hydraulic clutch pressure is susceptible to pressure fluctuation noise so that the clutch piston idle stroke cannot be always detected accurately in the disclosed control device.

It is therefore an object of the present invention to provide a hydraulic clutch control system and method for detecting a clutch piston idle stroke so as to determine a hydraulic pressure to be exerted to complete the clutch piston idle stroke and start power transmission accurately without the need for clutch complete engagement.

According to a first aspect of the present invention, there is provided a hydraulic clutch control system, comprising: a clutch; a hydraulic circuit that supplies a hydraulic pressure to a piston of the clutch so as to cause a stroke of the piston for engagement of the clutch; a primary hydraulic pressure signal generation unit that generates a primary hydraulic pressure signal to regulate a magnitude of the hydraulic pressure; a secondary hydraulic pressure signal generation unit that generates a secondary hydraulic pressure signal to induce fluctuations in the hydraulic pressure; a hydraulic pressure control unit that operates the hydraulic circuit to control the hydraulic pressure according to the primary and secondary hydraulic pressure signals; a detection unit that detects the amount of fluctuations in the hydraulic pressure; and a piston stroke judgment unit that judges the piston stroke based on the hydraulic pressure fluctuation amount.

According to a second aspect of the present invention, there is provided a hydraulic clutch control system, comprising: means for supplying a hydraulic pressure to a clutch to cause a clutch piston stroke for engagement of the clutch; means for generating a primary hydraulic pressure signal to regulate a magnitude of the hydraulic pressure; means for generating a secondary hydraulic pressure signal to induce fluctuations in the hydraulic pressure; means for controlling the hydraulic pressure according to the primary and secondary hydraulic pressure signals; means for detecting the amount of fluctuations in the hydraulic pressure; and means for judging the clutch piston stroke based on the hydraulic pressure fluctuation amount.

According to a third aspect of the present invention, there is provided a hydraulic clutch control method, comprising: supplying a hydraulic pressure to a clutch to cause a clutch piston stroke for engagement of the clutch; generating a primary hydraulic pressure signal to regulate a magnitude of the hydraulic pressure; generating a secondary hydraulic pressure signal to induce fluctuations in the hydraulic pressure; controlling the hydraulic pressure according to the primary and secondary hydraulic pressure signals; detecting the amount of fluctuations in the hydraulic pressure; and judging the clutch piston stroke based on the hydraulic pressure fluctuation amount.

The other objects and features of the present invention will also become understood from the following description.

DESCRIPTIONS OF THE EMBODIMENTS

The present invention will be described below in detail with reference to the drawings. The following embodiment of the present invention specifically refers to a hydraulic clutch control system for an automotive vehicle.

Figure 1:
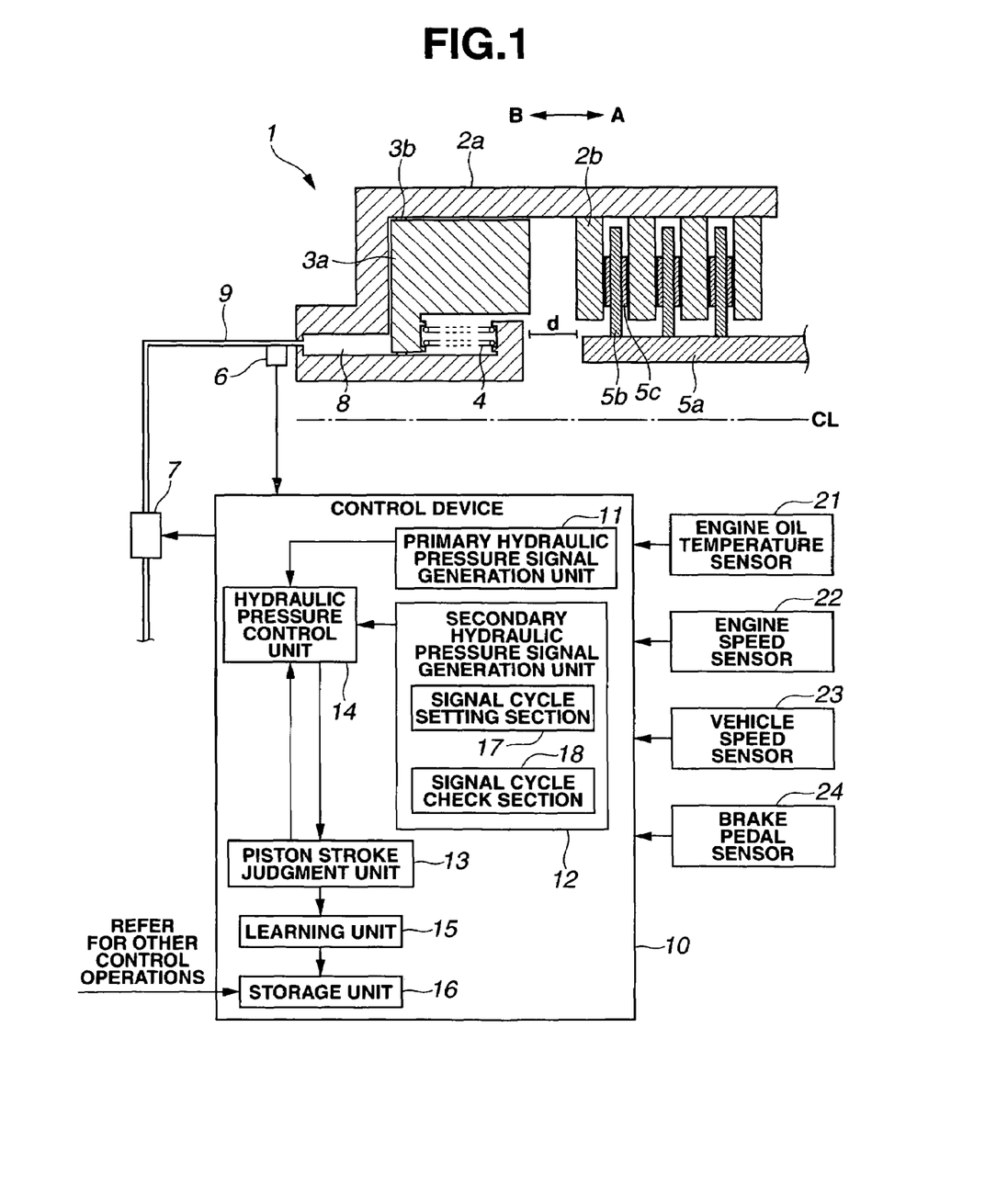
FIG. 1 is a schematic view of a hydraulic clutch control system according to one embodiment of the present invention.

Referring to FIG. 1, the hydraulic clutch control system of the present embodiment includes a friction clutch mechanism 1, a hydraulic circuit 7 for supplying a regulated amount of hydraulic oil from an oil pump (as a hydraulic pressure source) to the clutch mechanism 1 through a hydraulic passage 9, a pressure sensor (detection unit) 6 for detecting the pressure of hydraulic oil supplied to the clutch mechanism 1 and an electronic control device 10 for controlling the operations of the hydraulic circuit 7.

In the present embodiment, the friction clutch mechanism 1 is designed as a hydraulic multiple disc clutch (also called a wet-type multiple disc clutch) that has hollow input and output shafts 2a and 5a arranged rotatably relative to each other about a clutch shaft axis CL (indicated by a dashed line in FIG. 1) and connected to a vehicle engine (or motor) and wheels, respectively, so as to connect and disconnect the transmission of power from the engine to the wheels. It is noted that, as the clutch mechanism 1 is substantially symmetrical about the clutch shaft axis CL, only half part of the clutch mechanism 1 along the clutch shaft axis CL is shown in FIG. 1.

The clutch mechanism 1 has a plurality of drive discs 2b (as first rotary elements), a plurality of driven discs 5b (as second rotary elements) with friction plates 5c, a clutch piston 3a, a seal ring 3b and a return spring 4.

The drive discs 2b and the driven discs 5b are alternately arranged in parallel to one another between the clutch input shaft 2a and the clutch output shaft 5a. The drive discs 2b are fitted with an inner surface of the clutch input shaft 2a in such a manner that the drive discs 2b can slide relative to the clutch input shaft 2a along the clutch shaft axis CL and rotate about the clutch shaft axis CL together with the clutch input shaft 2a, whereas the driven discs 5b are fitted with an outer surface of the clutch output shaft 5a in such a manner that the driven discs 5b can slide relative to the clutch output shaft 5a along the clutch shaft axis CL and rotate about the clutch shaft axis CL together with the clutch output shaft 5a. The friction plates 5c are attached to opposite sides of the driven discs 5b and sandwiched between adjacent pairs of the drive discs 2b and the driven discs 5b.

The clutch piston 3a is slidably disposed between the inner surface of the clutch input shaft 2a and the outer surface of the clutch output shaft 5a. There is defined a hydraulic chamber 8 in communication with the hydraulic passage 9 so that the clutch piston 3a slides relative to the clutch input shaft 2a and the clutch drive discs 2b along the clutch shaft axis CL in response to the supply of hydraulic oil from the hydraulic circuit 7 into the hydraulic chamber 8 through the hydraulic passage 9. In the present embodiment, the amount of displacement of the clutch piston 3a toward the clutch drive discs 2b (in the direction A in FIG. 1) increases with the hydraulic oil pressure supplied from the hydraulic circuit 7 into the hydraulic chamber 8 through the hydraulic passage 9. The seal ring 3b is held between the sliding surface portions of the clutch input shaft 2a and the clutch piston 3a to provide seal against leakage of the hydraulic oil from the hydraulic chamber 8.

The return spring 4 is disposed between the clutch input shaft 2a and the clutch piston 3a to bias the clutch piston 3a apart from the clutch drive discs 2b (in the direction B in FIG. 1). The strength of tension of the return spring 4 is adjusted in such a manner that the clutch piston 3a becomes fully biased in the direction B to leave a clearance of d between the clutch piston 3a and the clutch drive disc 2b when the hydraulic oil pressure supplied into the hydraulic chamber 8 and exerted on the clutch piston 3a (hereinafter referred to as the "hydraulic clutch pressure") is lower than a given threshold level.

With such an arrangement, the clutch piston 3a moves against the tension of the return spring 4 and presses the clutch drive discs 2b in the direction A so as to bring the clutch drive discs 2b into engagement with the clutch driven discs 5b when the hydraulic clutch pressure is set higher than or equal to the given threshold level. Upon engagement of the clutch discs 2b and 5b, the transmission of power from the clutch input shaft 2a to the clutch output shaft 5a is allowed due to friction resistance between the clutch drive discs 2b and the friction plates 5c. When the hydraulic clutch pressure is set lower than the given threshold level, the clutch piston 3a moves in the direction B by the tension of the return spring 4 so as to disengage the clutch drive discs 2b from the clutch driven discs 5b and prevent the occurrence of a drag torque in the clutch mechanism 1.

Herein, the position of the clutch piston 3a at which there is a clearance of d left between the clutch piston 3a and the clutch drive disc 2b is defined as a "reference position", and the displacement of the clutch piston 3a from the reference position in the direction A is defined as a "stroke".

When the clutch piston 3a is in the reference position (i.e. the stroke of the clutch piston 3a is zero), the amount of clearance between the clutch piston 3a and the clutch drive disc 2b is equal to the length d. While the clutch piston 3a moves in the direction A, the amount of clearance between the clutch piston 3a and the clutch drive disc 2b is given by subtraction of the clutch piston stroke from the length d. When the clutch piston 3 comes into contact with the clutch drive disc 2b (i.e. the stroke of the clutch piston 3 becomes equal to the length d) to leave no clearance between the clutch piston 3a and the clutch drive disc 2b, the clutch mechanism 1 shifts in a so-called partial engagement state (slip state) so as to start power transmission from the clutch input shaft 2a to the clutch output shaft 5a.

In the clutch mechanism 1, the amount of power transmitted from the clutch input shaft 2a to the clutch output shaft 5a varies depending on the strength of friction between the clutch drive discs 2b and the clutch driven discs 5b, i.e., the strength of force with which the clutch piston 3a presses the clutch drive discs 2b against the clutch driven discs 5b. When the force of the clutch piston 3a to press the clutch drive discs 2b against the clutch driven discs 5b increases to a given level, there is no difference in rotation speeds between the clutch input shaft 2a and the clutch output shaft 5a so that the clutch mechanism 1 shifts into a complete engagement state. The engagement state of the clutch mechanism 1 can be thus controlled according to the hydraulic clutch pressure.

The hydraulic circuit 7 has a pressure regulation valve operated by the control device 10 to regulate the supply of hydraulic oil into the hydraulic chamber 8 and increase and decrease the hydraulic clutch pressure selectively.

The pressure sensor 6 is mounted on the hydraulic passage 9 at a location adjacent to the clutch piston 3a so as to detect the pressure of hydraulic oil in the hydraulic passage 9 as the actual value of the hydraulic clutch pressure and output a detection signal responsive to the detected hydraulic pressure value to the control device 10. In the present embodiment, the hydraulic oil pressure detected by the pressure sensor 6 is equal to the hydraulic oil pressure regulated by the hydraulic circuit 7 in a steady state where the clutch piston 3a makes no stroke movement but is not equal to the hydraulic oil pressure regulated by the hydraulic circuit 7 in a non-steady state under the stroke movement of the clutch piston 3a. The pressure sensor 6 may alternatively be arranged to detect the pressure of hydraulic oil in the hydraulic chamber 8 as the actual hydraulic clutch pressure value.

There are further provided an engine oil temperature sensor 21 to detect an engine oil temperature of the vehicle, an engine speed sensor 22 to detect an engine speed of the vehicle, a vehicle speed sensor 23 to detect a traveling speed of the vehicle and a brake pedal sensor 24 to detect a brake pedal depression of the vehicle. These detection values are also outputted to the control device 10.

Referring again to FIG. 1, the control device 10 includes a primary hydraulic pressure signal generation unit 11, a secondary hydraulic pressure signal generation unit 12, a piston stroke judgment unit 13, a hydraulic pressure control unit 14, a learning unit 15 and a storage unit 16, for learning control of the hydraulic clutch pressure.

Figure 2A:
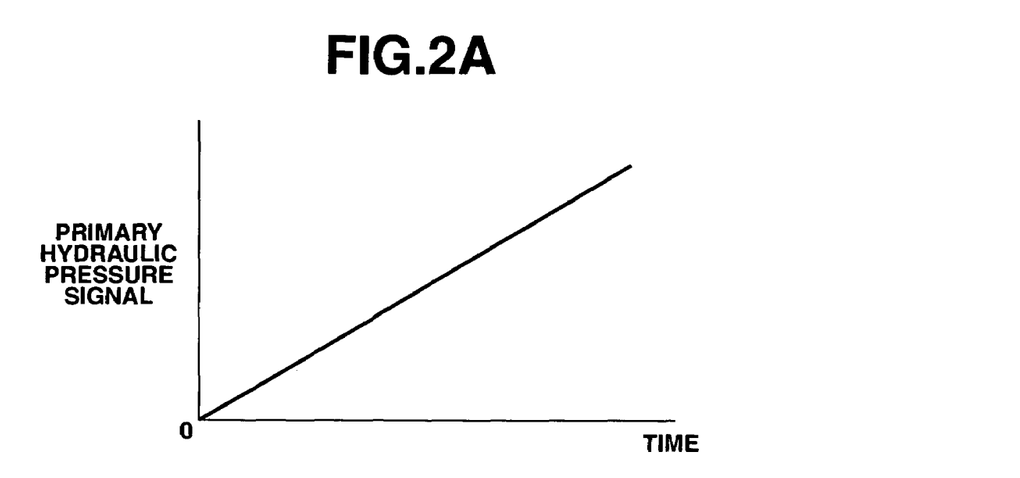
FIG. 2A is a graph showing the waveform of a primary hydraulic pressure signal of the clutch control system according to one embodiment of the present invention.

The primary hydraulic pressure signal generation unit 11 generates and outputs a primary hydraulic pressure signal to the hydraulic pressure control unit 14. The primary hydraulic pressure signal is used to regulate the magnitude of the hydraulic clutch pressure and determine the position of the clutch piston 3a for detection of the stroke of the clutch piston 3a. In the present embodiment, the intensity (e.g. current or voltage intensity) of the primary hydraulic pressure signal gradually increases with time as shown in FIG. 2A, such that the intensity gradient of the primary hydraulic pressure signal corresponds to the rate of increase of the hydraulic clutch pressure, i.e., the stroke speed of the clutch piston 3a. The intensity of the primary hydraulic pressure signal is further set in such a manner that the initial value of the hydraulic clutch pressure provided under the primary hydraulic pressure signal becomes lower than the threshold level.

Figure 2B:
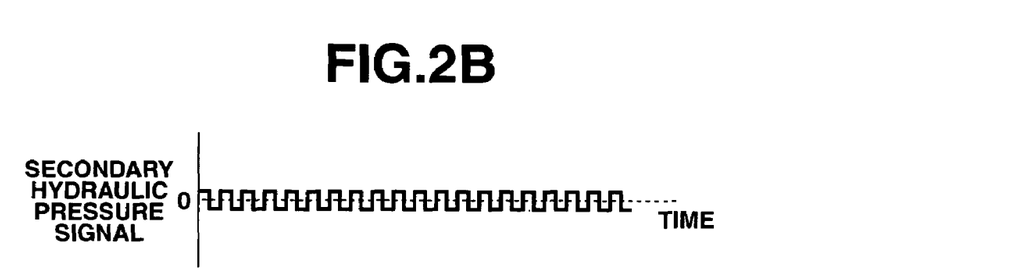
FIG. 2B is a graph showing the waveform of a secondary hydraulic pressure signal of the clutch control system according to one embodiment of the present invention.

The secondary hydraulic pressure signal generation unit 12 generates and outputs a secondary hydraulic pressure signal to the hydraulic pressure control unit 14. The secondary hydraulic pressure signal is applied to the primary hydraulic pressure signal so as to allow the utilization of hydraulic pressure transfer characteristics of the clutch mechanism 1 for detection of the stroke of the clutch piston 3a. For example, the secondary hydraulic pressure signal can be a wave signal with predetermined amplitude and periodicity. Examples of the wave signal include an alternating signal having a sine waveform or a pulse signal having a square waveform. In the present embodiment, the secondary hydraulic pressure signal is provided in the form of square wave pulses, as shown in FIG. 2B, to easily induce fluctuations in the hydraulic clutch pressure. The pulse amplitude and cycle period of the secondary hydraulic pressure signal are adjusted as will be described later.

Figure 2C:
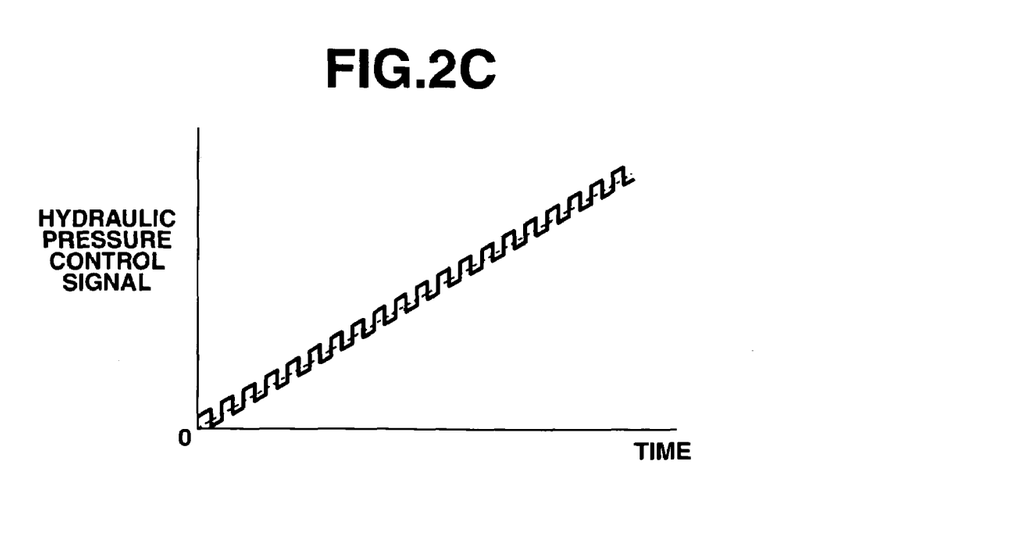
FIG. 2C is a graph showing the waveform of a hydraulic pressure control signal of the clutch control system according to one embodiment of the present invention.

The hydraulic pressure control unit 14 superimposes the primary and secondary hydraulic pressure signals on each other to obtain a hydraulic pressure control signal responsive to the command value of the hydraulic clutch pressure. The hydraulic pressure control signal is of pulse waveform as shown in FIG. 2C. The hydraulic pressure control unit 14 also operates the hydraulic circuit 7 to increase the hydraulic clutch pressure according to the intensity of the hydraulic pressure control signal.

The piston stroke judgment unit 13 judges the stroke of the clutch piston 3a based on the amount of fluctuations of the hydraulic clutch pressure.

Figure 3:
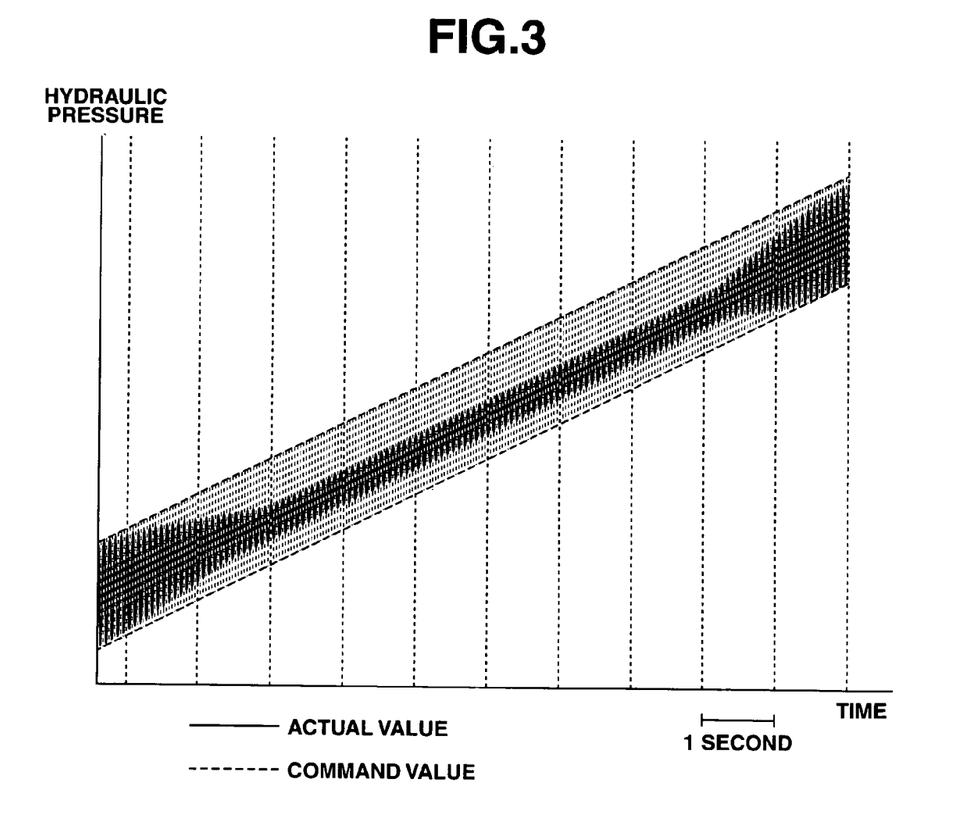
FIG. 3 is a graph showing secular hydraulic pressure changes in the hydraulic clutch control system according to one embodiment of the present invention.
Figure 4A:
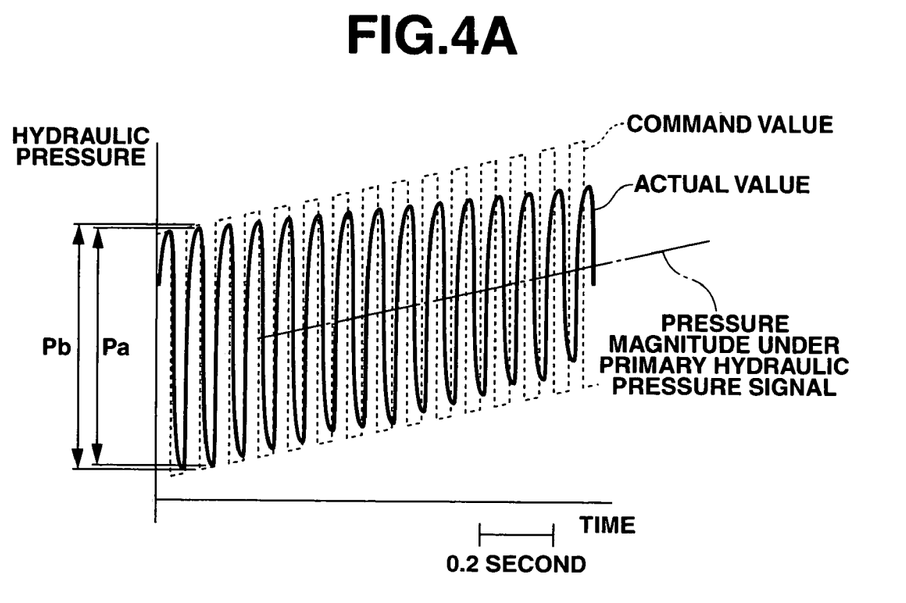
FIG. 4A is a graph showing hydraulic pressure changes in the hydraulic clutch control system, not during the clutch piston stroke, according to one embodiment of the present invention.
Figure 4B:
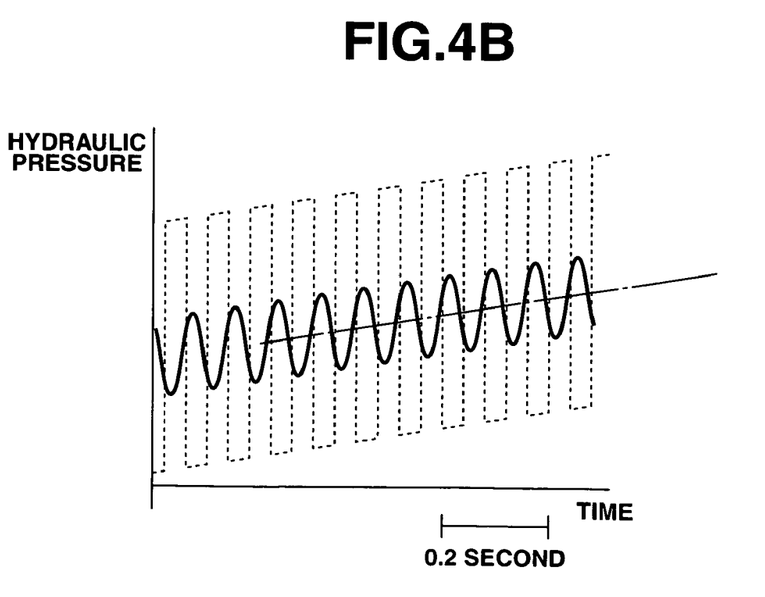
FIG. 4B is a graph showing hydraulic pressure changes in the hydraulic clutch control system, during the clutch piston stroke, according to one embodiment of the present invention.

As shown in FIGS. 3, 4A and 4B, the hydraulic clutch pressure gradually increases with vibrational fluctuations under the hydraulic pressure control signal from the hydraulic pressure control unit 14. More specifically, the hydraulic clutch pressure has an average magnitude regulated under the primary hydraulic pressure signal and shows a small amount of fluctuations in response to the pulses of the secondary hydraulic pressure signal.

The fluctuations of the hydraulic clutch pressure are substantially conserved by virtue of the reaction force of the clutch piston 3a as shown in FIG. 4A in a steady state where the clutch piston 3 is in the reference position with no stroke movement. However, the fluctuations of the hydraulic clutch pressure are absorbed by a volume change in the hydraulic chamber 8 as shown in FIG. 4B in a non-steady state under the stroke movement of the clutch piston 3a due to the fact that some of the energy of such pressure fluctuations is converted into the elastic potential energy of the return spring 4. The fluctuations of the actual hydraulic clutch pressure lag behind the fluctuations of the command hydraulic pressure so that the amount of fluctuations of the actual hydraulic clutch pressure apparently decreases during the stroke of the clutch piston 3a. When the clutch piston 3a comes into contact with the clutch drive disc 2b, the fluctuations of the hydraulic clutch pressure are substantially conserved by virtue of the reaction force of the clutch drive disc 2b as shown in FIG. 4A. The response lag of the actual hydraulic clutch pressure relative to the command hydraulic pressure becomes cancelled to recover the amount of fluctuations of the hydraulic clutch pressure upon completion of the stroke of the clutch piston 3a.

According to such hydraulic pressure transfer characteristics, the piston stroke judgment unit 13 judges the initiation and completion of the stroke of the clutch piston 3a by comparison of the amplitude (fluctuation amount) of the hydraulic pressure detection signal from the pressure sensor 6 and the amplitude (fluctuation amount) of the secondary hydraulic pressure signal from the secondary hydraulic pressure signal generation unit 12 or the hydraulic pressure control signal from the hydraulic pressure control unit 14. There is no to perform an arithmetic operation/computation such as differentiation susceptible to pressure noise in the present embodiment. It is thus possible to detect the stroke of the clutch piston 3a and learn the clutch engagement point easily and accurately at any time before the complete engagement of the clutch mechanism 1, without regard to the magnitude of the hydraulic clutch pressure (i.e. the signal intensities), so as to determine the hydraulic pressure to be exerted to complete the stroke of the clutch piston 3a and start the power transmission properly and achieve system simplification and versatility improvements. In particular, the control of the hydraulic clutch pressure under the wave signal allows easy and accurate detection of the periodic hydraulic clutch oil response and provides improvements in stroke judgment accuracy and system simplification and controllability.

More specifically, the piston stroke judgment unit 13 determines the amplitude Pa of the hydraulic pressure detection signal from the pressure sensor 6 and the amplitude Pb of the hydraulic pressure control signal from the hydraulic pressure control unit 14, calculates a ratio of the amplitude Pa of the hydraulic pressure detection signal to the amplitude Pb of the hydraulic pressure control signal, and then, judges the stroke of the clutch piston 3a according to the calculated amplitude ratio Pa/Pb in the present embodiment. During the stroke of the clutch piston 3a, the amplitude Pa of the hydraulic pressure detection signal becomes small relative to the amplitude Pb of the hydraulic pressure control signal as explained above so that the amplitude ratio Pa/Pb decreases considerably. The piston stroke judgment unit 13 is then allowed to easily judge that clutch piston 3a is making a stroke movement when the amplitude ratio Pa/Pb is lower than 1 and that the clutch piston 3a is making no stroke movement when the amplitude ratio Pa/Pb is substantially 1. In view of detection errors of the pressure sensor 6, the piston stroke judgment unit 13 judges the initiation of the stroke movement of the clutch piston 3a at the time when the amplitude ratio Pa/Pb becomes lower than a first threshold value H1 and to judge the completion of the stroke movement of the clutch piston 3a at the time when the amplitude ratio Pa/Pb becomes increased to or exceeds a second threshold value H2. The threshold values H1 and H2 are herein set in such a manner as to satisfy the relationship of H1<H2<1. In this way, the initiation of the stroke of the clutch piston 3a (to start eliminating the clearance between the clutch piston 3a and the clutch drive disc 2b) and the completion of the stroke of the clutch piston 3a (to start transmitting the power through the clutch mechanism 1 upon shifting from the clutch disengagement state into the partial engagement state) can be judged easily and accurately by monitoring the hydraulic clutch pressure continuously from before the initiation of the stroke of the clutch piston 3a until after the completion of the stroke of the clutch piston 3a.

Further, the piston stroke judgment unit 13 causes the hydraulic pressure control unit 14 to stop the hydraulic circuit 7 and terminate the learning control of the hydraulic clutch pressure upon judging the completion of the stroke of the clutch piston 3a. This makes it possible to detect the stroke of the clutch piston 3a and learn the clutch engagement point assuredly before the complete engagement of the clutch mechanism 1.

The learning unit 15 learns the values of the hydraulic clutch pressure (provided under the primary hydraulic pressure signal or the hydraulic pressure detection signal) at the time of initiation and completion of the stroke of the clutch piston 3a based on the judgment results of the piston stroke judgment unit 13 and stores these piston stroke initiation and completion points in the storage unit 15 for reference to various control operations such as vehicle drive/shift control.

For improvements in learning accuracy, the learning unit 15 judges the satisfaction of learning conditions based on the input about various vehicle operation parameters such as clutch torque transmission, engine oil temperature, engine speed, vehicle speed and/or brake pedal depression from the sensors 6 and 21 to 24. When the learning conditions are satisfied, the learning unit 15 learns the piston stroke initiation and completion points. On the other hand, the learning unit 15 causes the hydraulic pressure control unit 14 to stop the hydraulic circuit 7 and interrupt the learning control of the hydraulic clutch pressure when the learning conditions are not satisfied. It is herein an essential condition that the clutch mechanism 1 is not in a torque transmitting state. Examples of the other learning conditions are that: (1) the engine oil temperature is stable within a predetermined temperature range; (2) the engine speed is stable without fluctuations (i.e. there are no fluctuations in the centrifugal force exerted on the clutch mechanism 1 and the centrifugal hydraulic pressure in the hydraulic chamber 8); and (3) the engine speed is set to zero by the brake pedal depression (i.e. the vehicle is in a stop state under neutral/idle control). These conditions may be used solely or in combination thereof. For instance, when the clutch mechanism 1 is in the torque transmitting state, the stroke of the clutch piston 3 is already zero so that the initiation and completion of the stroke of the clutch piston 3 cannot be detected. It is thus possible to check whether the vehicle is in a state of being suitable for piston stroke detection, eliminate the influences of the other control operations (such as vehicle drive/shift control) and detect the stroke of the clutch piston 3a with improved accuracy by judgment of the satisfaction or unsatisfaction of the learning conditions. It is also possible to detect the stroke of the clutch piston 3a and learn the clutch engagement point more assuredly before the complete engagement of the clutch mechanism 1 so as not to interfere with ordinary clutch control operation.

The storage unit 16 stores therein the hydraulic clutch pressure values learned by the learning unit 15 upon judging the initiation and completion of the stroke of the clutch piston 3a so that these values can be referred to in any other control operations (such as vehicle drive/shift control). The storage unit 16 also stores, as an interrupted hydraulic pressure signal, the intensity of the primary hydraulic pressure signal responsive to the value of the hydraulic clutch pressure when the learning unit 15 judges that the learning conditions are not satisfied, and then, outputs the interrupted hydraulic pressure signal to the hydraulic pressure control unit 14 when the learning unit 15 judges that the learning conditions are satisfied again. Upon receipt of the interrupted hydraulic pressure signal, the hydraulic pressure control unit 14 reconstitutes the hydraulic pressure control signal by superimposing of the interrupted hydraulic pressure signal and the secondary hydraulic pressure signal and thereby continues the interrupted learning control of the hydraulic clutch pressure. The learning time can be shortened at the restart of the learning control of the hydraulic clutch pressure.

For accurate piston stroke judgment, it is herein preferable to adjust the amplitude of the secondary hydraulic pressure signal to a level capable of inducing hydraulic pressure fluctuations greater than a minimum detectable pressure change of the pressure sensor 6 but not so large that the stroke of the clutch piston 3a becomes caused (initiated or completed) by the hydraulic pressure fluctuations induced under the secondary hydraulic pressure signal for assured detection of change of the hydraulic clutch pressure response characteristic even during the stroke of the clutch piston 3a. Further, the supply of the hydraulic clutch pressure is stopped upon completion of the stroke of the clutch piston 3a as explained above, so that the clutch mechanism 1 would output a small amount of torque during a time period between the instant when the clutch mechanism 1 shifts in the partial engagement state by completion of the stroke of the piston stroke 3a and the instant when the supply of the hydraulic clutch pressure comes to a full stop. As the amplitude of the hydraulic pressure control signal (the amplitude of the secondary hydraulic pressure signal) increases, the engagement of the clutch mechanism 1 becomes strengthened to cause an increase in the amount of torque outputted from the clutch mechanism 1 during such a time period before the stop of the hydraulic clutch pressure supply. It is accordingly preferable to adjust the amplitude of the secondary hydraulic pressure signal in such a manner that the torque outputted from the clutch mechanism 1 immediately after the completion of the stroke of the clutch piston 3a produces little difference in the effect on driver' feeling between the presence and absence of the secondary hydraulic pressure signal (i.e. vehicle shaking/shock resulting from changes in clutch output torque and engine speed in response to the fluctuations of the hydraulic pressure control signal immediately after the completion of the stroke of the clutch piston 3a cannot be sensed by a vehicle driver, or even if sensed, does not cause driver's discomfort). For example, the amplitude of the secondary hydraulic pressure signal can be set in such a manner that the fluctuation amplitude (e.g. 20 kPa) of the hydraulic clutch pressure caused by the secondary hydraulic pressure signal is approximately equivalent to one-tenth of the initial value (e.g. 180 kPa) of the hydraulic clutch pressure provided under the primary hydraulic pressure signal, thereby limiting the acceleration exerted on the vehicle by torque transmission immediately after the engagement of the clutch mechanism 1 (immediately after the completion of the stroke of the clutch piston 3a) to less than 0.03 G. This makes it possible to detect the stroke of the clutch piston 3a while protecting the vehicle driver from discomfort even in a situation that the engine torque is transmitted to the clutch output side.

Figure 8A:
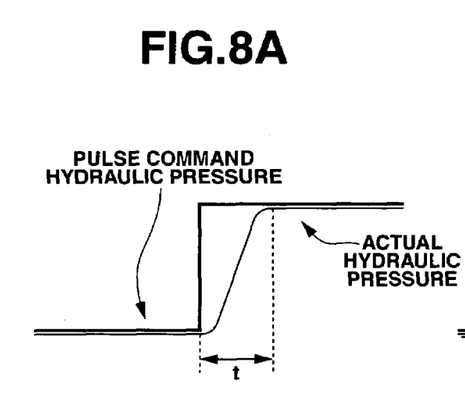
FIGS. 8A, 8B, 8C and 8D are graphs showing the cycle period settings of the secondary hydraulic pressure signal according to one embodiment of the present invention.
Figure 8B:
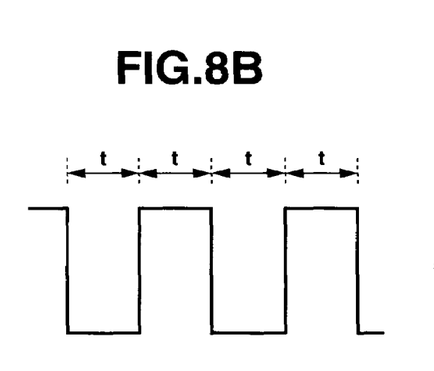

In the present embodiment, the secondary hydraulic pressure signal generation unit 12 includes a signal cycle setting section 17 and a signal cycle check section 18 as shown in FIG. 1, so as to adjust the cycle period of the secondary hydraulic pressure signal appropriately within a time period where the learning conditions are satisfied during unexecution of the learning control of the hydraulic clutch pressure (before the start of the learning control of the hydraulic clutch pressure). The cycle period of the secondary hydraulic pressure signal is preferably set in such a manner that half the cycle period of the secondary hydraulic pressure signal is equal in length to the response lag time t of the hydraulic clutch pressure under no stroke movement of the clutch piston 3a as shown in FIGS. 8A and 8B. The response lag time t is a measure of the rate of change of the hydraulic clutch pressure response lag (corresponding to the time constant of the hydraulic clutch pressure), which is independent of the amplitude of the secondary hydraulic pressure signal.

Figure 8C:
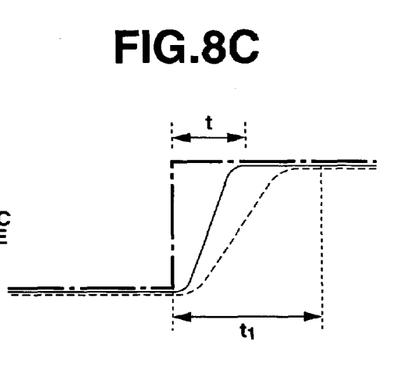
Figure 8D:
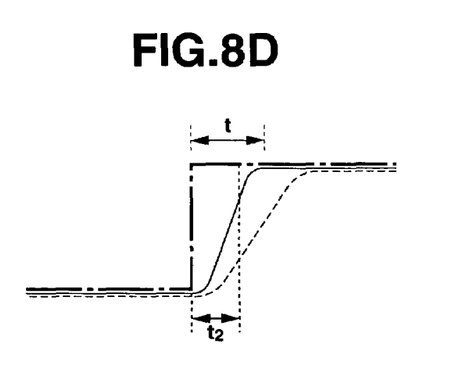

Theoretically, the fluctuations of the hydraulic clutch pressure are conserved and detected by the pressure sensor 6 in a steady state where the stroke of the clutch piston 3a is zero. In practice, however, the fluctuations of the hydraulic clutch pressure cannot be detected adequately even in such a steady state due to various factors (e.g. the viscosity and density variations of the hydraulic oil due to oil temperature changes, the configuration of the hydraulic passage 9 and the arrangement position of the pressure sensor 6) when the cycle period (the inverse of the frequency) of the secondary hydraulic pressure signal is too long or too short. For example, it is assumed that the half period t1 of the secondary hydraulic pressure signal is too long relative to the response lag time t of the hydraulic clutch pressure as shown in FIG. 8C. Even if the actual hydraulic clutch pressure lags behind the command hydraulic pressure as indicated by a broken line in FIG. 8C during the stroke of the clutch stroke 3a, such a response lag will not be detected unless the time exceeds than t1. It is now assumed that the half period t2 of the second hydraulic pressure signal is too short relative to the response lag time t of the hydraulic clutch pressure as shown in FIG. 8D. In this case, the response lag of the actual hydraulic clutch pressure will be detected not only during the stroke of the clutch stroke 3a but also not during the stroke of the clutch piston 3a. There thus arises a difficulty in judging the initiation and completion of the stroke of the clutch piston 3a. For the above reasons, the cycle period of the secondary hydraulic pressure signal is adjusted to a suitable level for detection of change of the hydraulic pressure response characteristic the depending on the hydraulic oil conditions.

The signal cycle setting section 17 generates a reference hydraulic pressure signal by setting the pulse cycle of the reference hydraulic signal to a sufficiently short degree that the fluctuations of the hydraulic clutch pressure cannot be detected by the pressure sensor 6 adequately in a steady state under no stroke movement of the clutch piston 3a. The signal cycle setting section 17 then outputs the reference hydraulic pressure signal to the hydraulic pressure control unit 14 and causes the hydraulic pressure control unit 14 to control the hydraulic clutch pressure according to the reference hydraulic pressure signal only.

The signal cycle check section 18 checks whether or not the reference pulse signal cycle is appropriate as the cycle period of the second hydraulic pressure signal by amplitude comparison of the hydraulic pressure detection signal from the pressure sensor 6 and the reference hydraulic pressure signal from the signal cycle setting section 17. In the present embodiment, the amplitude of the reference hydraulic pressure signal is identical to that of the hydraulic pressure control signal. The appropriateness of the pulse signal cycle can be thus judged by amplitude comparison of the hydraulic pressure detection signal and the hydraulic pressure control signal. More specifically, the signal cycle check section 18 determines the amplitude Pa' of the hydraulic pressure detection signal and the amplitude Pb of the reference hydraulic pressure signal, calculates a ratio of the amplitude Pa' of the hydraulic pressure detection signal to the amplitude Pb of the reference hydraulic pressure signal, and then judges the appropriateness of the pulse signal cycle according to the calculated amplitude ratio Pa'/Pb. When the calculated amplitude ratio Pa'/Pb is lower than 1, the signal cycle check section 18 judges that the reference pulse signal cycle is not appropriate as the cycle period of the secondary hydraulic pressure signal and causes the signal cycle setting section 17 to gradually increase the reference pulse signal cycle to an appropriate level. When the amplitude ratio Pa'/Pb becomes higher than or equal to 1, the signal cycle check unit 18 judges that the reference pulse signal cycle is appropriate as the cycle period of the secondary hydraulic pressure signal and causes the signal cycle setting section 17 to adopt the current pulse signal cycle as the cycle period of the secondary hydraulic pressure signal.

Figure 5:
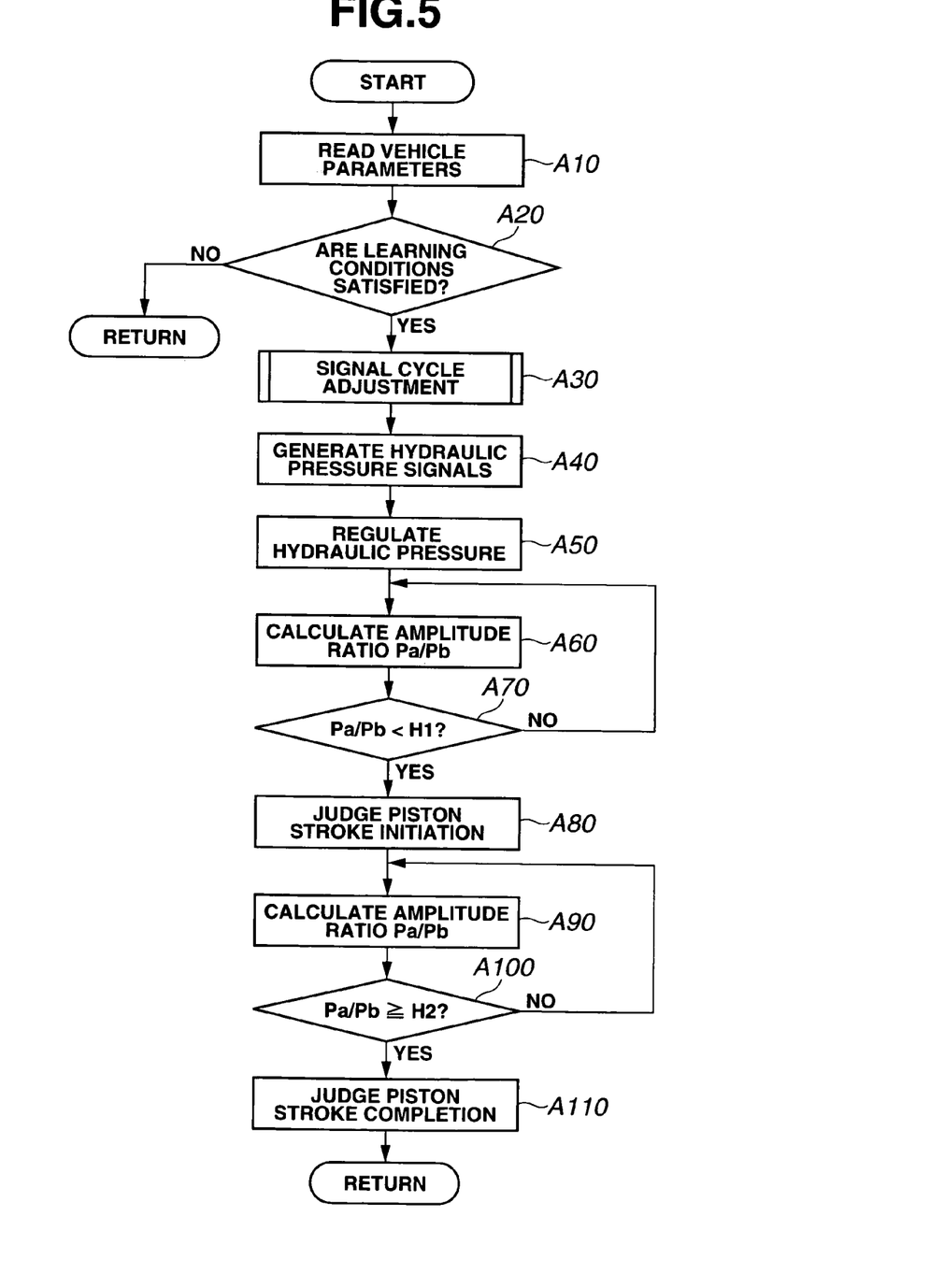
FIG. 5 is a flowchart for a hydraulic pressure control program of the clutch control system according to one embodiment of the present invention.

The above learning control routine of the hydraulic clutch pressure is performed by the following procedure shown in FIG. 5 in the present embodiment.

In step A10, the control device 10 enables the learning unit 15 to read various vehicle operation parameters from the sensors 6 and 21 to 24.

In step A20, the control device 10 enables the learning unit 15 to judge whether the learning conditions are satisfied or not. If the learning conditions are not satisfied (No in step A20), the control exits process routine. If the learning conditions are satisfied (Yes in step A20), the control proceeds to step A30.

In step A30, the control unit 10 enables the second hydraulic pressure signal generation unit 12 to adjust the cycle period of the secondary hydraulic pressure signal appropriately through the execution of a signal cycle adjustment subroutine.

In step A40, the control device 10 enables the primary and secondary hydraulic pressure signal generation units 11 and 12 to output the primary and secondary hydraulic pressure signals to the hydraulic pressure control unit 14, respectively. In the case that the learning control is being temporarily interrupted, the control device 10 alternatively enables the storage unit 16 to output the interrupted hydraulic pressure signal to the hydraulic pressure control unit 14.

In step A50, the control device 10 enables the hydraulic pressure control unit 14 to generate the hydraulic pressure control signal by superimposing of the primary hydraulic pressure signal (or the interrupted hydraulic pressure signal) and the secondary hydraulic pressure signal, and then, to operate the hydraulic circuit 7 in such a manner as to control the hydraulic clutch pressure according to the hydraulic pressure control signal.

In step A60, the control device 10 enables the piston stroke judgment unit 13 to determine the amplitude Pa of the hydraulic pressure detection signal and the amplitude Pb of the hydraulic pressure control signal and to calculate the amplitude ratio Pa/Pb.

In step A70, the control device 10 enables the piston stroke judgment unit 13 to decide whether the amplitude ratio Pa/Pb is lower than the first threshold value H1 (H1<1). If Pa/Pb≧H1 (No in step A70), the control goes back to step A60. If Pa/Pb<H1 (Yes in step A70), the control proceeds to step A80.

Figure 7:
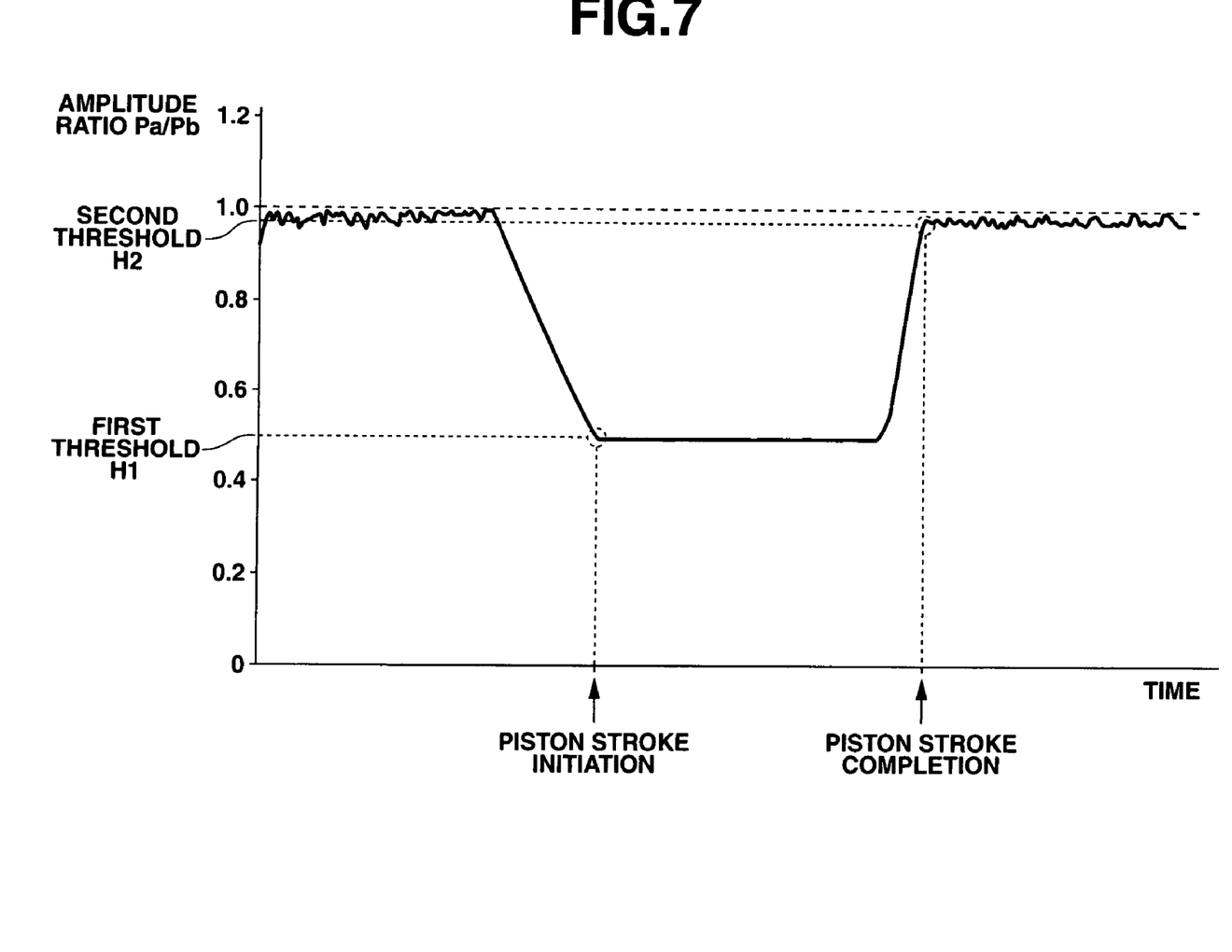
FIG. 7 is a schematic view showing how to judge the clutch piston stroke according to one embodiment of the present invention

As explained above, the amount of fluctuations of the actual hydraulic clutch pressure decreases so that the amplitude ratio Pa/Pb becomes lower as shown in FIG. 7 immediately before the initiation of the stroke of the clutch piston 3a. The initiation of the stroke of the clutch piston 3a can be thus judged when the amplitude ratio Pa/Pb becomes lower than the first threshold value H1.

Upon judging the initiation of the stroke of the clutch piston 3a, the control device 10 enables in step A80 the learning unit 15 to learn the value of the hydraulic clutch pressure at the time of initiation of the stroke of the clutch piston 3a and store this hydraulic pressure value in the storage unit 16.

In step A90, the control device 10 enables the piston stroke judgment unit 13 to determine the amplitude Pa of the hydraulic pressure detection signal and the amplitude Pb of the hydraulic pressure control signal and to calculate the amplitude ratio Pa/Pb. It is noted that the amount of fluctuations of the actual hydraulic clutch pressure is kept small during the stroke of the clutch piston 3a so that the amplitude ratio Pa/Pb is lower than 1 in this routine step.

In step A100, the control device 10 enables the piston stroke judgment unit 13 to decide whether the amplitude ratio Pa/Pb is higher than the second threshold value H2. If Pa/Pb<H2 (Yes in step A100), the control goes back to step A90. If Pa/Pb≧H2 (o in step A100), the control proceeds to step A110.

The amount of fluctuations of the actual hydraulic clutch pressure increases so that the amplitude ratio Pa/Pb becomes higher as shown in FIG. 7 immediately before the completion of the stroke of the clutch piston 3a. The completion of the stroke of the clutch piston 3a can be thus judged when the amplitude ratio Pa/Pb becomes higher than or equal to the second threshold value H2.

Upon judging the completion of the stroke of the clutch piston 3a, the control device 10 enables in step A110 the learning unit 15 to learn the value of the hydraulic clutch pressure at the time of completion of the stroke of the clutch piston 3a and store this hydraulic pressure value in the storage unit 16.

As described above, the control device 10 is able to judge the initiation and completion timings of the stroke of the clutch piston 3a, detect the engagement point of the clutch mechanism 1 and determine the hydraulic pressure to be exerted on the clutch piston 3a to complete the clutch piston idle stroke and start the power transmission easily and accurately with a simple and versatile device configuration.

Figure 6:
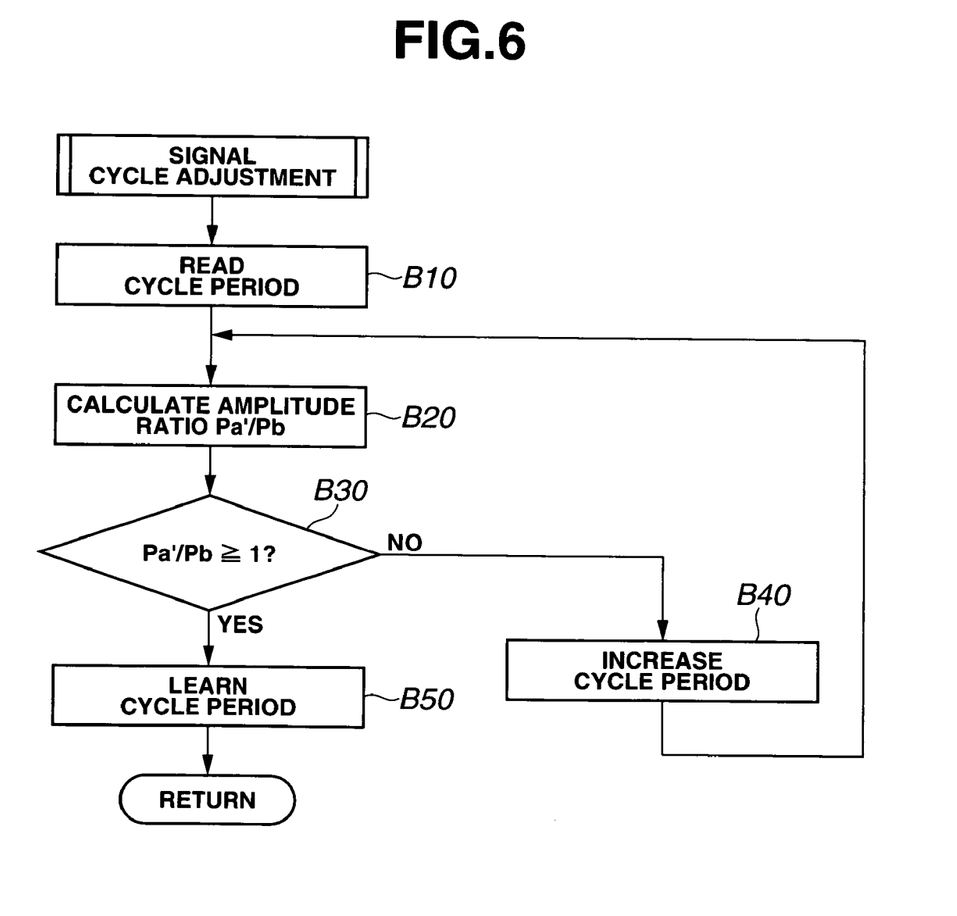
FIG. 6 is a flowchart for a signal cycle adjustment program of the clutch control system according to one embodiment of the present invention.

The signal cycle adjustment subroutine is performed by the following procedure shown in FIG. 6 in the present embodiment.

In step B10, the secondary hydraulic pressure signal generation unit 12 enables the signal cycle setting section 17 to read the pulse cycle period of the reference hydraulic pressure signal. The reference pulse signal cycle read by the signal cycle setting section 17 in this routine step is the initial cycle period value of the reference hydraulic pressure signal or the cycle period value of the reference hydraulic pressure signal set in the preceding signal cycle adjustment subroutine.

In step B20, the secondary hydraulic pressure signal generation unit 12 enables the signal cycle check section 18 to determine the amplitude Pa' of the hydraulic pressure detection signal and the amplitude Pb of the reference hydraulic pressure signal and to calculate the amplitude ratio Pa'/Pb.

In step B30, the secondary hydraulic pressure signal generation unit 12 enables the signal cycle check section 18 checks whether the amplitude ratio Pa'/Pb is higher than or equal to 1. If Pa'/Pb<1 (Yes in step B30), the control proceeds to step B40. If Pa'/Pb≧1 (No in step B30), the control proceeds to step B50.

In step B40, the secondary hydraulic pressure signal generation unit 12 enables the signal cycle check section 18 to determine that the reference pulse signal cycle is not appropriate to the cycle period of the secondary hydraulic pressure signal and enables the signal cycle setting section 17 to adjust the reference pulse signal cycle to a longer value. The control then goes back to step B20.

In step B50, the secondary hydraulic pressure signal generation unit 12 enables the signal cycle check section 18 to determine that the reference pulse signal cycle is appropriate to the cycle period of the secondary hydraulic pressure signal and enables the signal cycle setting section 17 to set the reference pulse signal cycle to the cycle period of the secondary hydraulic pressure signal.

In this way, the secondary hydraulic pressure signal generation unit 12 is allowed to adjust the cycle period of the secondary hydraulic pressure signal easily and appropriately in such a manner that half the cycle period of the secondary hydraulic pressure signal is equal in length to the response lag time t of the hydraulic clutch pressure under no stroke movement of the clutch piston 3a.

The entire contents of Japanese Patent Application No. 2005-164398 (filed on Jun. 3, 2005) are herein incorporated by reference.

Although the present invention has been described with reference to the specific embodiment of the invention, the invention is not limited to the above-described embodiment. Various modification and variation of the embodiment described above will occur to those skilled in the art in light of the above teaching.

Figure 9:
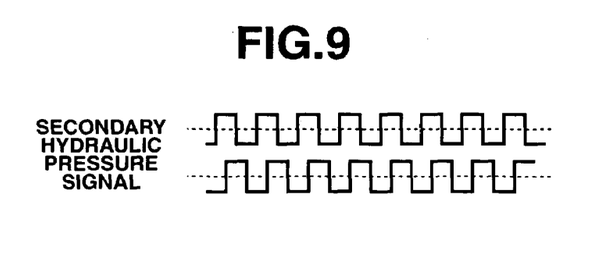
FIG. 9 is a schematic view of signal phase shift control of the clutch control system according to a modification of the embodiment of the present invention.

The learning control of the hydraulic clutch pressure can be applied even when the clutch mechanism 1 is of any type of hydraulic clutch other than the multiple disc clutch. For example, the clutch mechanism 1 may alternatively be designed as a double clutch assembly with clutches, each of which is structured as shown in FIG. 1. In this case, it is desirable to modify the system in such a manner that: the hydraulic circuit 7 supplies hydraulic pressures to cause strokes of the pistons 3a for engagement of the clutches, respectively; the primary hydraulic signal generation unit 11 generates primary hydraulic pressure signals to regulates the magnitudes of the hydraulic clutch pressures, respectively; the second hydraulic signal generation unit 12 generates secondary hydraulic pressure signals to cause fluctuations in the hydraulic clutch pressures, respectively; the hydraulic pressure control unit 14 operate the hydraulic circuit 7 to control the hydraulic clutch pressures according to the hydraulic pressure control signals, respectively; the detection unit is provided with pressure sensors 6 to detect the amounts of fluctuations of the hydraulic clutch pressures, respectively; and the piston stroke judgment unit 13 judges the strokes of the clutch pistons 3a based on the amounts of fluctuations of the hydraulic clutch pressures, respectively. The learning control of the hydraulic clutch pressure can be continuously performed for detection of the clutch piston idle stroke in the unactuated side of the clutch units of the double clutch. It is further desirable that the second hydraulic pressure signals are phase shifted to each other, as shown in FIG. 9, in order to prevent interference between the second hydraulic pressure signals i.e. between the hydraulic pressure control signals and judge the stroke of each clutch piston 3a with improved accuracy.

The secondary hydraulic pressure signal is not necessarily a wave signal with predetermined amplitude and periodicity and can be provided in any form that allows the utilization of the hydraulic pressure transfer characteristics of the clutch mechanism 1 for detection of the stroke of the clutch piston 3a.

Further, the learning unit 15 is not necessarily provided. The control device 10 may alternatively be configured to allow the piston stroke judgment unit 13 to judge the stoke of the clutch piston 3a as occasion requires.

The technique of adjusting the cycle period of the secondary hydraulic pressure signal is not particularly restricted, and the cycle period of the secondary hydraulic pressure signal can be adjusted by any other appropriate method. For example, the reference pulse signal cycle may be initially set to a sufficiently large degree and gradually decreased to an appropriate degree although the reference pulse signal cycle is initially set to a sufficiently small degree and gradually increased to an appropriate degree in the present embodiment. The pulse signal cycle may be increased or decreased stepwisely.

Although the appropriateness of the pulse signal cycle is judged depending on whether the amplitude ratio Pa'/Pb is 1 or not in the present embodiment, it is alternatively possible to judge that the pulse signal cycle is appropriate when the amplitude ratio Pa'/Pb becomes higher than or equal to a threshold value H3 (H3<1) in view of variations of the hydraulic pressure characteristics and detection errors of the pressure sensor 6.

The scope of the invention is defined with reference to the following claims.

What is claimed is:

1. A hydraulic clutch control system, comprising:
   a clutch;
   a hydraulic circuit that supplies a hydraulic pressure to a piston of the clutch so as to cause a stroke of the piston for engagement of the clutch;
   a primary hydraulic pressure signal generation unit that generates a primary hydraulic pressure signal to regulate a magnitude of the hydraulic pressure;
   a secondary hydraulic pressure signal generation unit that generates a secondary hydraulic pressure signal to induce fluctuations in the hydraulic pressure;
   a hydraulic pressure control unit that operates the hydraulic circuit to control the hydraulic pressure according to the primary and secondary hydraulic pressure signals;
   a detection unit that detects the amount of fluctuations in the hydraulic pressure; and
   a piston stroke judgment unit that judges the piston stroke based on the hydraulic pressure fluctuation amount.

2. The hydraulic clutch control system according to claim 1, wherein the detection unit outputs a hydraulic pressure detection signal responsive to an actual value of the hydraulic pressure; and wherein the piston stroke judgment unit judges the piston stroke based on a ratio between the amount of fluctuations of the hydraulic pressure detection signal and the amount of fluctuations of the secondary hydraulic pressure signal.

3. The hydraulic clutch control system according to claim 1, wherein the secondary hydraulic pressure signal is a wave signal with predetermined periodicity and amplitude.

4. The hydraulic clutch control system according to claim 3, wherein the detection unit outputs a hydraulic pressure detection signal responsive to an actual value of the hydraulic pressure; wherein the hydraulic pressure control unit applies the secondary hydraulic pressure signal to the primary hydraulic pressure signal to output a hydraulic pressure control signal responsive to a command value of the hydraulic pressure; and wherein the piston stroke judgment unit judges the piston stroke based on a ratio between the amplitude of the hydraulic pressure detection signal and the amplitude of the hydraulic pressure control signal.

5. The hydraulic clutch control system according to claim 4, wherein the piston stroke judgment unit judges that the piston is making no stroke movement when the amplitude ratio is substantially equal to 1 and that the piston is making a stroke movement when the amplitude ratio is deviated from 1.

6. The hydraulic clutch control system according to claim 3, wherein the primary hydraulic pressure signal generation unit gradually increases the intensity of the primary hydraulic pressure signal during the stroke of the piston.

7. The hydraulic clutch control system according to claim 5, wherein the piston stroke judgment unit judges the initiation of the piston stroke movement when the amplitude ratio becomes lower than a first threshold value; and wherein the first threshold value is substantially smaller than 1.

8. The hydraulic clutch control system according to claim 5, wherein the piston stroke judgment unit judges the completion of the piston stroke movement when the amplitude ratio becomes higher than a second threshold value; and wherein the second threshold value is substantially smaller than 1.

9. The hydraulic clutch control system according to claim 3, wherein the secondary hydraulic pressure signal generation unit sets the period of the secondary hydraulic pressure signal in such a manner that half the period of the secondary hydraulic pressure signal is equal in length to a response lag of the actual hydraulic pressure value behind the command hydraulic pressure value under no stroke movement of the piston.

10. The hydraulic clutch control system according to claim 3, wherein the secondary hydraulic pressure signal generation unit sets the amplitude of the secondary hydraulic pressure signal to a level capable of inducing hydraulic pressure fluctuations detectable by the detection unit while preventing driver discomfort caused by a power output of the clutch immediately after the completion of the piston stroke.

11. The hydraulic clutch control system according to claim 3, wherein the secondary hydraulic pressure signal generation unit sets the amplitude of the secondary hydraulic pressure signal to a level capable of inducing hydraulic pressure fluctuations in such a manner as to prevent the piston stroke from being initiated and completed by the induced hydraulic pressure fluctuations.

12. A hydraulic clutch control system according to claim 3, the system comprising clutches with respective pistons;
the hydraulic circuit supplying hydraulic pressures to the pistons so as to cause strokes of the pistons for engagement of the clutches, respectively;
the primary hydraulic signal generation unit generating primary hydraulic pressure signals to regulates the magnitudes of the hydraulic pressures, respectively;
the secondary hydraulic signal generation unit generating secondary hydraulic pressure signals to induce fluctuations in the hydraulic pressures, respectively, the secondary hydraulic pressure signals being phase shifted to each other;
the hydraulic pressure control unit operating the hydraulic circuit to control the hydraulic pressures according to the primary and secondary hydraulic pressure signals, respectively;
the detection unit detecting the amounts of fluctuations in the hydraulic pressures, respectively; and
the piston stroke judgment unit judging the piston strokes based on the hydraulic pressure fluctuation amounts, respectively.

13. The hydraulic clutch control system according to claim 1, wherein the hydraulic pressure control unit allows the hydraulic circuit to stop the supply of the hydraulic pressure when the piston stroke judgment unit judges the completion of the piston stroke.

14. The hydraulic clutch control system according to claim 1, wherein the piston stroke judgment unit judges the piston stroke when the clutch is in a non torque transmitting state; and wherein the system further comprises a learning unit to learn the piston stroke from the piston stroke judgment unit.

15. The hydraulic clutch control system according to claim 14, wherein the learning unit learns the piston stroke upon satisfaction of a learning condition.

16. The hydraulic clutch control system according to claim 15, further comprising a storage unit,
wherein the learning unit learns a value of the hydraulic pressure and stores the learned hydraulic pressure value in the storage unit when the learning condition is unsatisfied and allows the hydraulic pressure control unit to control the magnitude of the hydraulic pressure to the stored hydraulic pressure value when the learning condition is satisfied again.

17. A hydraulic clutch control system, comprising:
means for supplying a hydraulic pressure to a clutch to cause a clutch piston stroke for engagement of the clutch;
means for generating a primary hydraulic pressure signal to regulate a magnitude of the hydraulic pressure;
means for generating a secondary hydraulic pressure signal to induce fluctuations in the hydraulic pressure;
means for controlling the hydraulic pressure according to the primary and secondary hydraulic pressure signals;
means for detecting the amount of fluctuations in the hydraulic pressure; and
means for judging the clutch piston stroke based on the hydraulic pressure fluctuation amount.

18. A hydraulic clutch control method, comprising:
supplying a hydraulic pressure to a clutch to cause a clutch piston stroke for engagement of the clutch;
generating a primary hydraulic pressure signal to regulate a magnitude of the hydraulic pressure;
generating a secondary hydraulic pressure signal to cause fluctuations in the hydraulic pressure;
controlling the hydraulic pressure according to the primary and secondary hydraulic pressure signals;
detecting the amount of fluctuations in the hydraulic pressure; and
judging the clutch piston stroke based on the hydraulic pressure fluctuation amount.

* * * * *